United States Patent [19]

Sangregory et al.

[11] Patent Number: 5,173,728
[45] Date of Patent: Dec. 22, 1992

[54] MAGNET AND SHUTTER ASSEMBLY FOR AN ELECTROMAGNETIC SHUTTER

[75] Inventors: Jude A. Sangregory, Spencerport; Robert L. Kuhn, Jr., Rush, both of N.Y.

[73] Assignee: Eastman Kodak Company, Rochester, N.Y.

[21] Appl. No.: 735,489

[22] Filed: Jul. 25, 1991

[51] Int. Cl.$^5$ .............................................. G03B 9/08
[52] U.S. Cl. ................................. 354/234.1; 310/191
[58] Field of Search ............... 354/234.1, 235.1, 271.1; 310/191, 209

[56] References Cited

U.S. PATENT DOCUMENTS

| | | | |
|---|---|---|---|
| 3,847,476 | 11/1974 | Onda et al. | 354/252 |
| 4,268,147 | 5/1981 | Date et al. | 354/234.1 X |
| 4,302,090 | 11/1981 | Kiuchi et al. | 354/234.1 |
| 4,312,583 | 1/1982 | Ohniwa et al. | 354/234.1 |
| 4,417,797 | 11/1983 | Senuma | 354/234.1 |
| 4,847,726 | 7/1989 | Mody | 354/234.1 X |

FOREIGN PATENT DOCUMENTS 63-36229  2/1988  Japan .................. 354/234.1

Primary Examiner—Richard A. Wintercorn
Assistant Examiner—Howard B. Blankenship
Attorney, Agent, or Firm—Ronald Reichman

[57] ABSTRACT

A device for connecting a shutter blade to a electromagnetic camera shuttering system that utilizes an armature for producing a first magnetic field, and a stop to control the movement of a shutter blade. The device comprises: a shutter blade that moves across the aperture of the camera and bounces off a stop to control the amount of light that is allowed to enter the camera; and a moveable magnet that produces a second magnetic field, the second magnetic field is coupled to the first magnetic field and a portion of the magnet is sized and shaped to fit the magnet to an orifice in the blade, so that when a portion of the magnet is placed in the orifice the blade will be directly connected to the magnet, and the presence or absence of the first magnetic field will cause the magnet and the blade to move to different orientations. Thus, the blade and the magnet will have a low rotational inertia to increase the speed of the blade and the friction between the blade and the magnet will be controlled to regulate the inertia of the blade and the magnet to prevent the blade from exposing the aperture of the camera when the blade bounces off the stop.

10 Claims, 5 Drawing Sheets

MAGNET AND SHUTTER ASSEMBLY FOR AN ELECTROMAGNETIC SHUTTER

RELATED APPLICATIONS

This application is directed to subject matter disclosed but not claimed in copending: U.S. Ser. No. 735,510 entitled "A DEVICE AND METHOD FOR ELECTROMAGNETICALLY ACTIVATING THE SHUTTER OF A CAMERA" filed herewith in the names of J. Kelly Lee, David R. Dowe, and Tom M. Seamans; U.S. Ser. No. 735,982 entitled "MULTI-APERTURE MAGNETIC SHUTTER" filed herewith in the names of John H. Alligood, John H. Minnick and David A. Castor; and U.S. Ser. No. 735,980 entitled "SELF CENTERING BI-DIRECTIONAL ELECTROMAGNETIC ACTUATOR" filed herewith in the names of David A. Castor, Tom M. Seamans, J. Kelly Lee and David R. Dowe.

BACKGROUND OF THE INVENTION

1. Field of the Invention

The invention relates generally to the field of photography, and particularly to a magnet and shutter blade assembly for a electromagnetically driven camera shutter blade.

2. Description of the Prior Art

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. When the shutter is open, the blades pivot away from the center of the aperture, so that light may pass through the aperture and expose the filmstrip. Sometimes an array of metal blades are not used, and the leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. Hence, one blade may block the opening of the other blade, or both blades openings may not be in optical alignment with the aperture. The power to open and close the leaf type mechanical shutters is provided by a spring or springs that are under tension, and the timing is controlled by a watch-type gear train.

Electromagnetic shutters have been developed to reduce the amount of energy or power that is required to open and close leaf type mechanical shutters. Electromagnetic shutters are faster than mechanical shutters from 4 mm diameter to 20 mm diameter aperture openings and electromagnetic shutters may be controlled with greater accuracy than mechanical shutters. The manufacturing cost of an electromagnetic shutter is less than the manufacturing cost of mechanical shutters.

Some prior art devices utilized a stop or stops to control the motion of one or more shutter blades. After the shutter blade was driven to an open position to allow light to pass through the aperture of a camera the blade would hit a stop and then be released off of the stop. If the energy of the blade was not quickly dampened, the blade would swing past the aperture opening and allow unwanted light to pass through the aperture opening and expose the filmstrip contained within the camera.

Some of the disadvantages of prior art electromagnetic powered shutters are: the solenoids used a large amount of current, i.e., approximately 2 amps; the solenoid had no intermediate positions, i.e., the solenoid and the lens aperture was either open or closed; and the solenoids were slow due to the inertia required to move the large mass of the solenoids plunger.

SUMMARY OF THE INVENTION

The present invention overcomes the disadvantages of the prior art, by providing a single electromagnetic shutter blade that provides two aperture openings. This invention reduces the number of components that are required in double aperture electromagnetic shutters by eliminating the linkage arm, that connected the shutter blade to the magnet.

The permanent magnet is placed between the pole pieces of an armature and sized and shaped to key into one end of the shutter blade, to reduce the inertia of the magnet and blade and induce a controlled amount of friction to prevent unwanted aperture openings. It is also easy to connect the magnet to the blade. The elimination of the linkage arm also reduces the possibility of rotational blade errors.

Since the permanent magnet only has to rotate its own mass and that of the shutter blade it can accelerate more quickly to its stopped position, than previous systems which employed a shutter blade with a linkage arm. Thus, faster shutter speeds are attainable.

Furthermore, this system will operate very consistently since the blade is directly driven by the permanent magnet. The foregoing is achieved by providing:

A device for connecting a shutter blade to a electromagnetic camera shuttering system that utilizes an armature for producing a first magnetic field, and a stop to control the movement of a shutter blade, said device comprises:

a shutter blade that moves across the aperture of a camera and bounces off a stop to control the amount of light that is allowed to enter an aperture; and a movable magnet that produces a second magnetic field, the second magnetic field is coupled to a first magnetic field that is produced by an armature and a portion of the magnet is sized and shaped to fit-the magnet to an orifice in the shutter blade, so that when a portion of the magnet is placed in the orifice the blade will be directly connected to the magnet, and the presence or absence of the first magnetic field will cause the magnet and blade to move to different orientations.

Thus, the magnet and blade will have a low rotational inertia to increase the speed of the blade. Furthermore, the friction between the magnet and the blade will be controlled to regulate the inertia of the magnet and blade to prevent the blade from exposing the aperture of the camera when the blade bounces off the stop.

DESCRIPTION OF A PREFERRED EMBODIMENT

Figure 1:
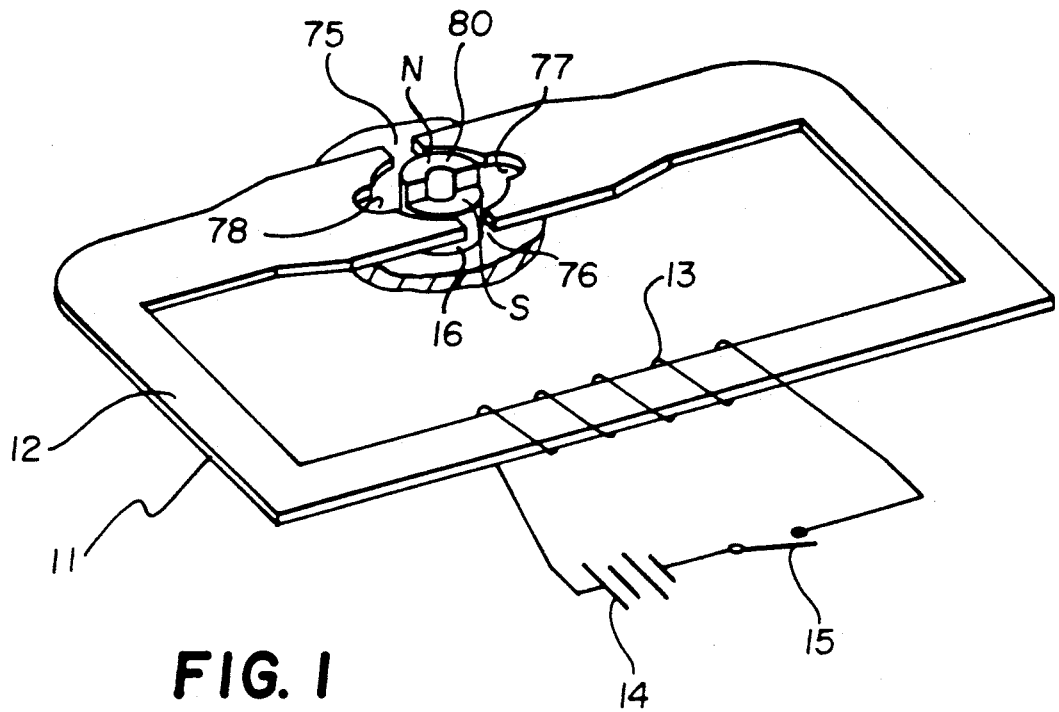
FIG. 1 is a diagram that illustrates the operation of this invention by showing a magnet in a first position.

Referring now to the drawings in detail, and more particularly to FIG. 1, the reference character 11 represents an armature that includes a core 12 and coil 13. Air gaps 75, 76, 77 and 78 appear in armature 11. The positive terminal of battery 14 is connected to one of the ends of coil 13 and the negative terminal of battery 14 is connected to one of the two terminals of switch 15. The second terminal of switch 15 is connected to the other end of coil 13.

Permanent magnet 16, which has a North pole (that is indicated on the drawings by the letter N) and a South pole (that is indicated on the drawings by the letter S) is positioned in armature 11 in a manner that gaps 75, 76, 77 and 78 will be present. Top portion 80 of magnet 16 is lug shaped. When switch 15 is open, no current will be supplied to coil 13 and magnet 16 will be positioned in the first position as shown in FIG. 1.

Figure 2:
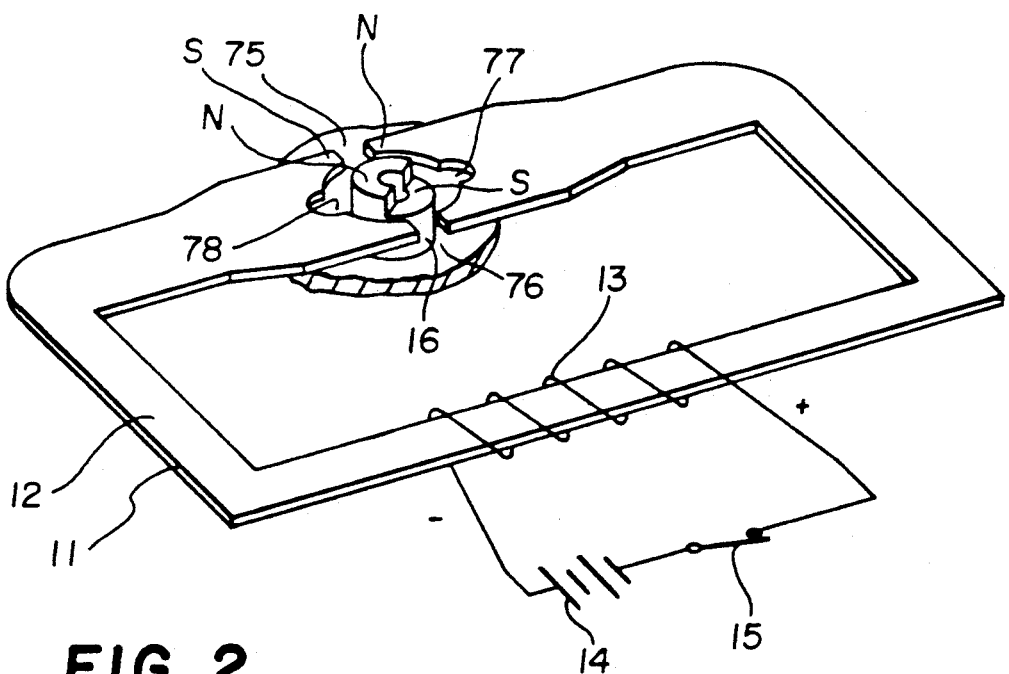
FIG. 2 is a diagram that illustrates the operation of this invention by showing a magnet in a second position.

FIG. 2 illustrates the position of magnet 16 when switch 15 is closed. The closing of switch 15 causes a current from battery 14 to appear in coil 13 and coil 13 to induce a magnetic field. The magnetic field causes the left side of core 12 to act as a South pole and the right side of core 12 to act as a North Pole. The electromagnetic flux from armature 11 will interact directly with the magnetic flux of magnet 16 causing magnet 16 to rotate. Gaps 77 and 78 insure that magnet 16 will be centered between gaps 75 and 76. The North pole of core 12 will attract the South pole of magnet 16 and cause magnet 16 to move to the second position which is shown in FIG. 2.

Figure 3:
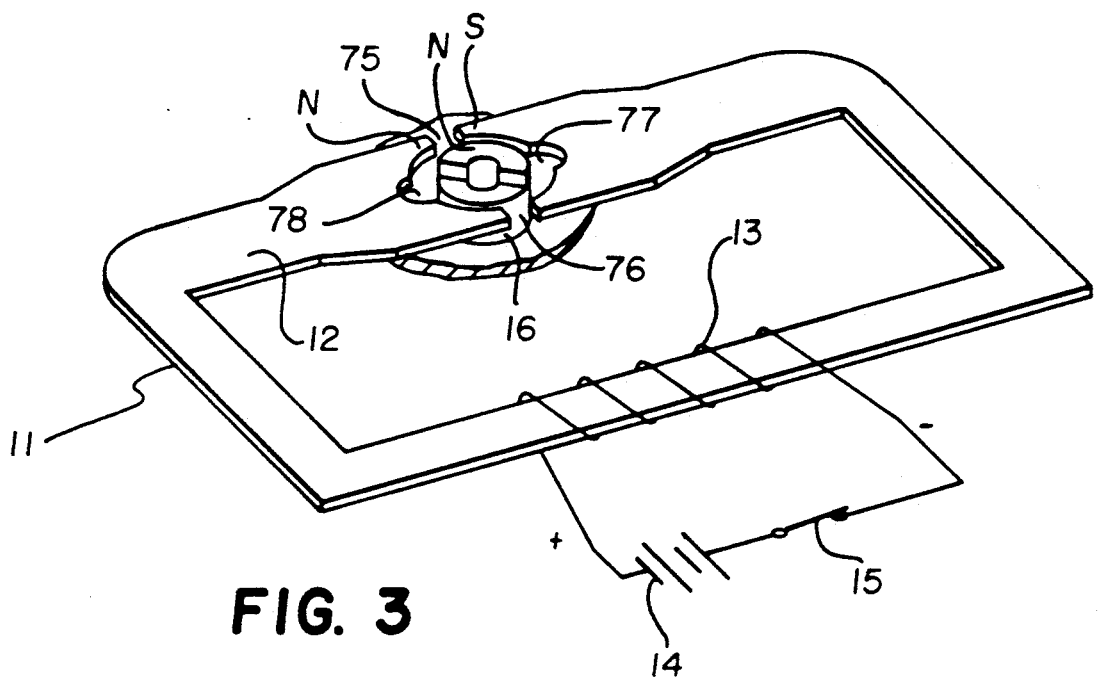
FIG. 3 is a diagram that illustrates the operation of this invention by showing a magnet in a third position.

FIG. 3 depicts the device shown in FIG. 1 and FIG. 2 with the polarity of battery 14 reversed. The closing of switch 15 causes a current from battery 14 to appear in coil 13 and coil 13 to induce a magnetic field. The magnetic field causes the right side of core 12 to act as a South pole and the left side of core 12 to act as a North pole. The electromagnetic flux from armature 11 will interact directly with the magnetic flux of magnet 16 causing magnet 16 to rotate. Gaps 77 and 78 insure that magnet 16 will be centered between gaps 75 and 76. The North pole of core 12 will attract the South pole of magnet 16 and cause magnet 16 to move to the third position which is shown in FIG. 3.

Figure 4:
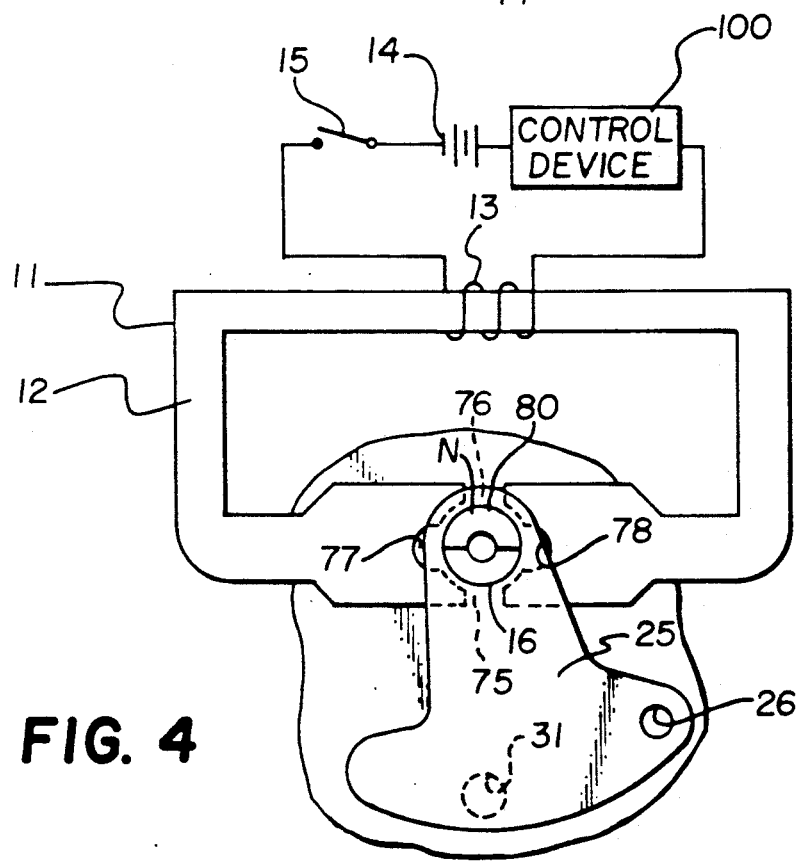
FIG. 4 is a diagram that illustrates a magnet attached to a shutter blade in the first position and the shutter blade blocking the aperture.

FIG. 4 shows magnet 16 having the position shown in FIG. 1 (first position) with coil 13 wrapped around core 12. Switch 15 is connected to one of the ends of coil 13 and one of the terminals of battery 14. The second terminal of battery 14 is connected to polarity controlling device 100. Device 100 is also connected to one of the ends of coil 13. Device 100 controls the direction of current flow in coil 13. The manner in which the coil current is controlled will be more fully set forth in the description of FIG. 9.

Shutter blade 25 has an aperture orifice 26. Blade 25 is shown in a closed position with blade 25 completely covering aperture 31 and not permitting any light to enter the optical path of the camera (not shown). Blade 25 is connected to magnet 16 by placing lug portion 80 of magnet 16 in an opening of blade 25. The manner in which the foregoing connection is made will be described in the description of FIG. 7 and FIG. 8. In this instance shutter switch 15 is open, and no current will be supplied to coil 13. Magnet 16 will be in the first position and shutter blade 25 will completely cover aperture 31.

Figure 5:
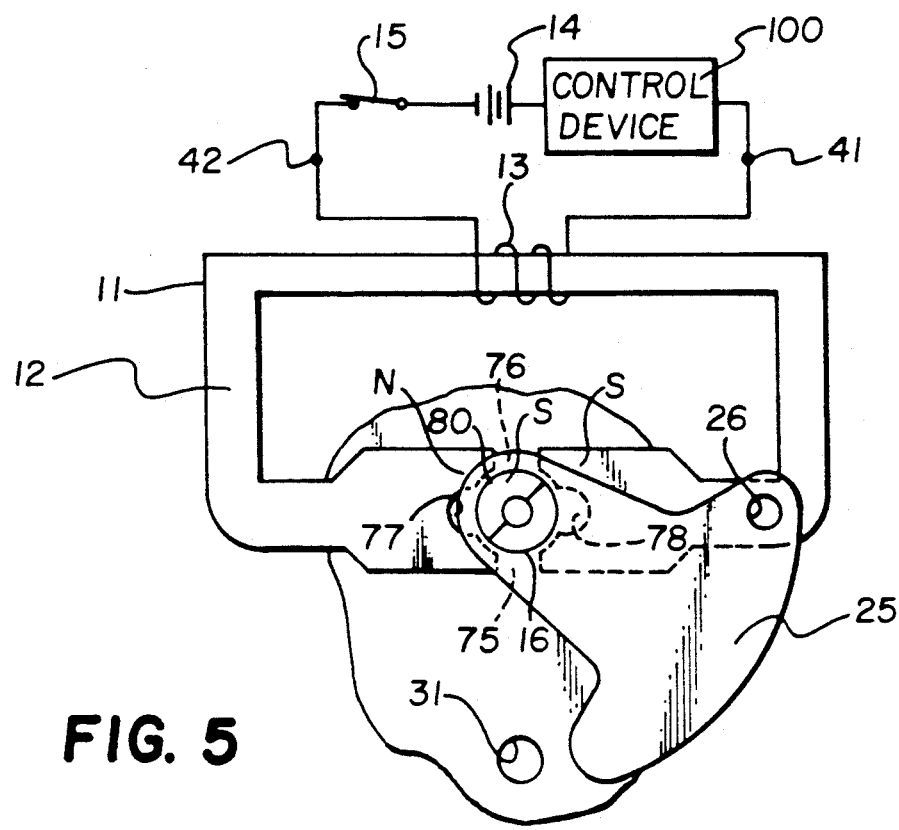
FIG. 5 is a diagram that illustrates a magnet attached to a shutter blade in the second position and the shutter blade forming a large aperture opening.

FIG. 5 shows the components illustrated in FIG. 4 with shutter switch 15 closed. The description of FIG. 9 will describe how device 100 causes current to flow from battery 14 to point 41 through coil 13 to point 42 and back to battery 14 or how device 100 causes current to flow from battery 14 to point 42 through coil 13 to point 41 and back to battery 14.

The closing of switch 15 causes a current from battery 14 to appear in coil 13 and coil 13 to induce a magnetic field. The magnetic field causes the right side of core 12 to act as a South pole and the left side of core 12 to act as a North pole. The electromagnetic flux from armature 11 will interact directly with the magnetic flux of magnet 16 causing magnet 16 to rotate. Gaps 77 and 78 insure that magnet 16 will be centered between gaps 75 and 76. The North pole of core 12 will attract the South pole of magnet 16 and cause magnet 16 to move to the second position which is shown in FIG. 5. Blade 25 will in its maximum open position. Aperture orifice 26 and blade 25 will not cover aperture opening 31. Thus, the maximum amount of light is allowed to enter the camera (not shown).

Figure 6:
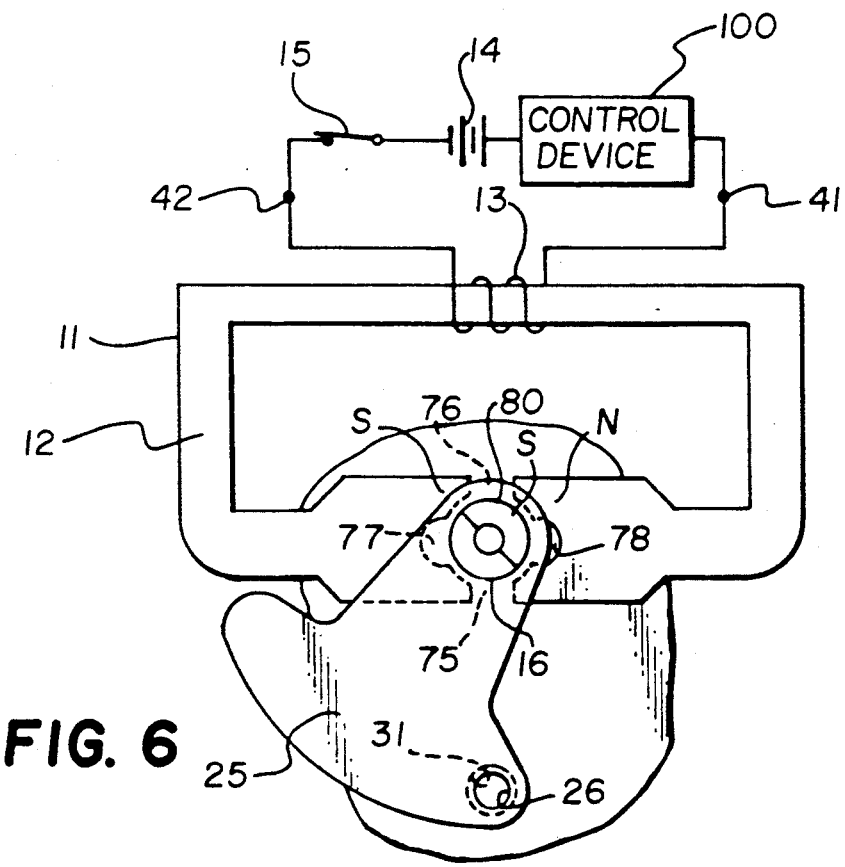
FIG. 6 is a diagram that illustrates a magnet in the third position and the shutter blade forming a small aperture opening.

FIG. 6 shows the components illustrated in FIG. 3 with shutter switch 15 closed. The description of FIG. 9 will describe how device 100 causes current to flow from battery 14 to point 41 through coil 13 to point 42 and back to battery 14 or how device 100 causes current to flow from battery 14 to point 42 through coil 13 to point 41 and back to battery 14.

The closing of switch 15 causes a current from battery 14 to appear in coil 13 and coil 13 to induce a magnetic field. The magnetic field causes the left side of core 12 to act as a South pole and the right side of core 12 to act as a North pole. The electromagnetic flux from armature 11 will interact directly with the magnetic flux of magnet 16 causing magnet 16 to rotate. Gaps 77 and 78 insure that magnet 16 will be centered between gaps 75 and 76. The North pole of core 12 will attract the South pole of magnet 16 and cause magnet 16 to move to the third position which is shown in FIG. 6. Blade 25 will in its minimum open position. Aperture orifice 26 of blade 25 will cover a portion of aperture opening 31 to allow a small amount of light to enter the camera (not shown).

Figure 7:
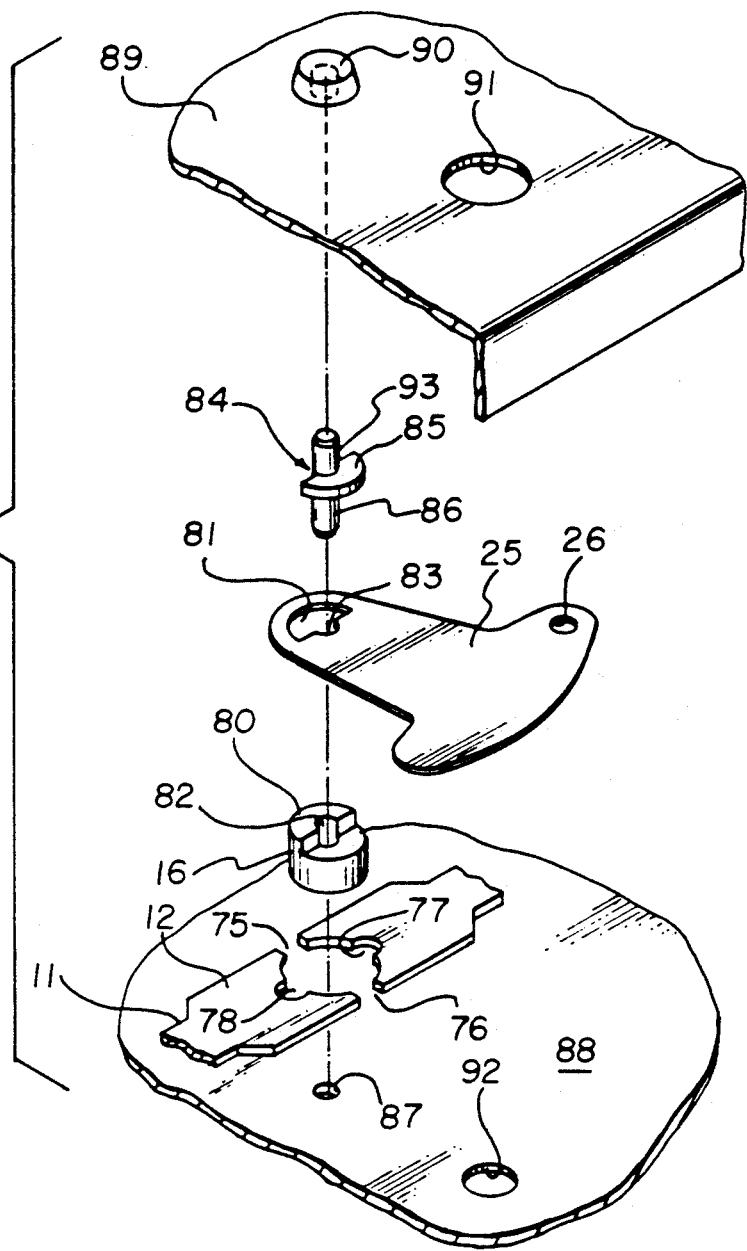
FIG. 7 is a diagram that illustrates the manner in which shutter blade 25 is connected to magnet 16.

FIG. 7 shows the manner in which shutter blade 25 is attached to magnet 16. Magnet 16 is placed within core 12 in a manner that forms air gaps 75, 76, 77 and 78, and allows the magnetic field induced by armature 11 to interact with the magnetic field produced by magnet 16.

Magnet 16 has a hole 82 running from its top surface to its bottom surface and blade 25 has an opening 83 which is next to orifice 81. Portion 80 of magnet 16 is sized and shaped like a lug, to key lug 80 to orifice 81(which is sized and shaped to accept lug 80). Thus, when lug 80 of magnet 16 is placed in orifice 81, blade 25 will be directly connected to magnet 16 and hole 82 will be in alignment with opening 83.

Bearing pin 84 has a projection 85 and pin portions 86 and 93. Projection 85 is sized and shaped to be the mirror image of lug 80. Hence, when pin 86 is placed in opening 83, hole 82 and hole 87 of bottom shutter enclosure plate 88, projection 85 will be flush with lug 80. Top shutter enclosure plate 89 has a raised area 90. Top plate 89 has an aperture opening 91, and bottom plate 88 has an aperture opening 92. Blade 25 has an aperture orifice 26. Plate 88 is attached to plate 89 by any known fastening means, i.e., glue, screws, etc. Pin portion 86 of bearing pin 84 will be able to rotate in hole 87 and pin portion 93 will be able to rotate in raised area 90. Magnet 16 and blade 25 with aperture orifice 26 may be moved, in the manner hereinbefore described, to allow light to enter aperture openings 91 and 92.

Magnet 16 is keyed to blade 25 to produce, a low rotational inertia direct drive, without any secondary fastening parts or adhesive. This forms a light weight, simple, low cost assembly. The low weight will mean that shutter blade 25 will have faster opening and closing times. Thus, the shutter speed of the camera (not shown) may be increased.

Bearing pin 85 may be constructed of a lighter weight material than magnet 16 and lug 80 i.e. plastic, etc. to facilitate the partial or full radially counterbalancing of the mass of blade 26 to prevent accidental exposure of the filmstrip due to rough handling of the camera (not shown).

Figure 8:
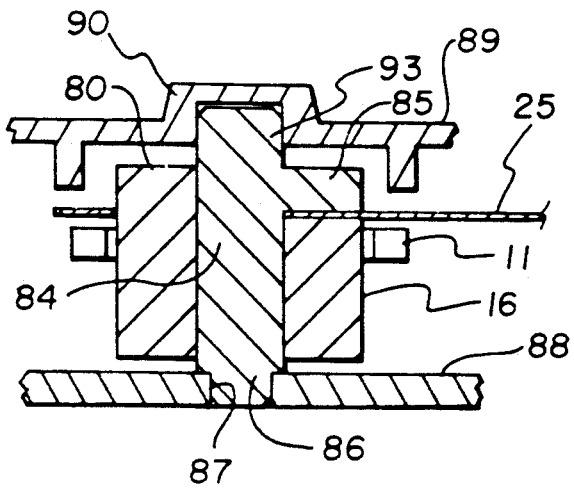
FIG. 8 is a side view of the components shown in FIG. 7.

FIG. 8 is a side sectional view of the components shown in FIG. 7. Pin portion 86 of bearing pin 84 is in hole 87 of bottom enclosure plate 88 and opening 83 (shown in FIG. 7) of shutter blade 25. Pin portion 93 of bearing pin 84 is in hole 90 of top shutter enclosure plate 89. Projection 85 of bearing pin 84 nests with magnet 16. Armature 11 and magnet 16 are located in specific positions to control the amount of friction produced by magnet 16.

The center of mass of armature 11 may be placed closer to top plate 89 or bottom plate 88. The center of mass of armature 11 is also the center of magnetic flux density of armature 11. In FIG. 8 armature 11 is placed closer to top plate 89. As previously mentioned in the description of FIGS. 1-6, magnet 16 is positioned in armature 11 in a manner that forms air gaps 75, 76, 77, and 78. The positioning of armature 11 towards plate 89 causes magnet 16 to sit against plate 89 with a constant force. This force induces a controlled amount of friction between magnet 16 and plate 89 which may be used to control blade 25.

For instances, when blade 25 is driven to an open position to expose a filmstrip, blade 25 will be held against a stop (not shown) and then released. If the motion of blade 25 is not controlled blade 25 may oscillate and cause orifice 26 to move across openings 91 and 92 creating unwanted exposures of the filmstrip. Thus, the frictional forces produced between blade 25 and plate 89 may be used to dampen the energy of blade 25 and prevent unwanted exposures of the filmstrip (not shown).

Figure 9:
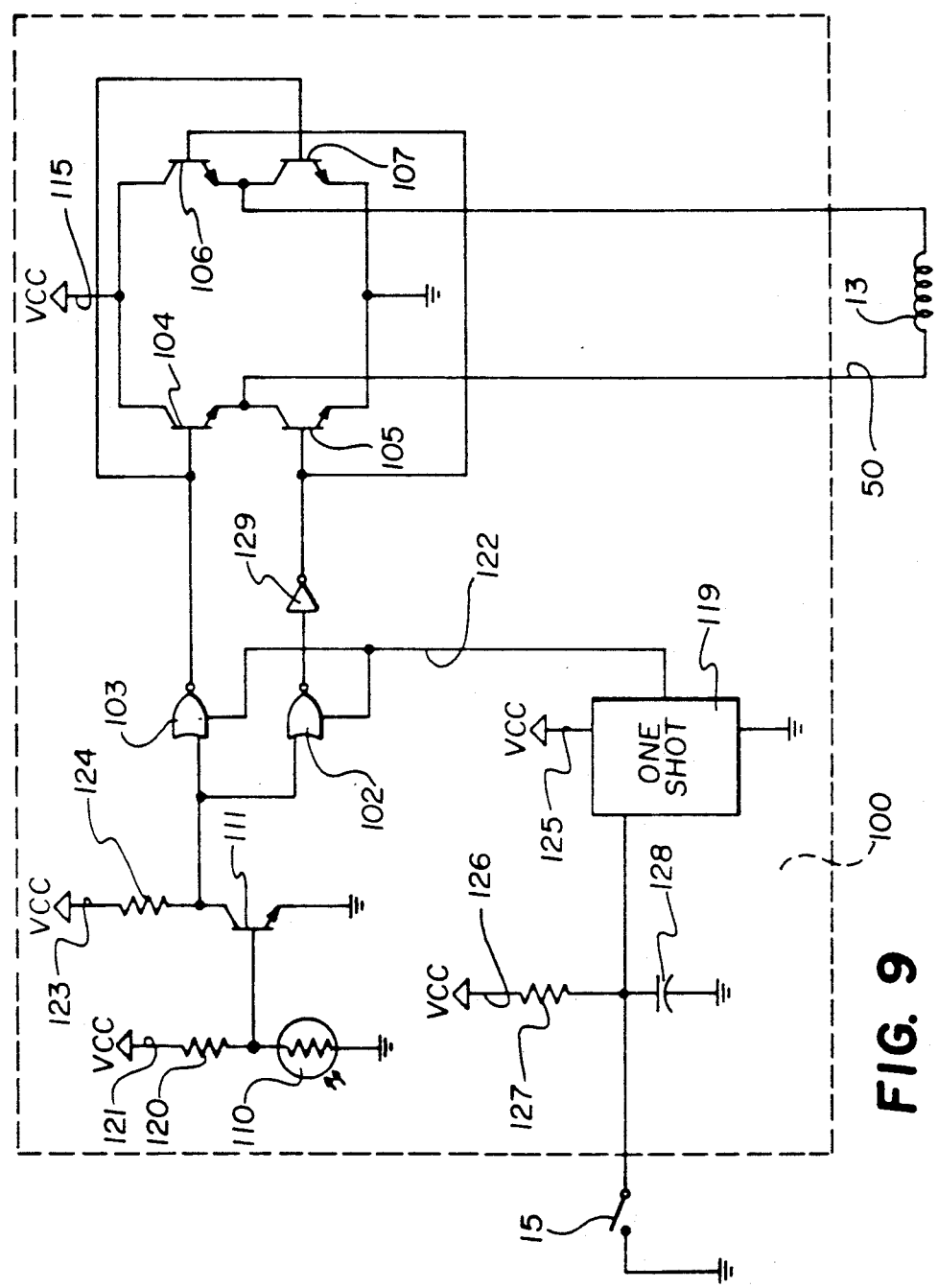
FIG. 9 is a logic diagram of the device for controlling the polarity of the coil shown in FIGS. 4-6.

FIG. 9 describes polarity controlling device 100 that was shown in FIGS. 4-6. Photocell 110 has two terminals. The first terminal is connected to ground, and the second terminal is connected to the base of NPN transistors 111 and one of the ends of resistor 120. The other end of resistor 120 is connected to the positive terminal of battery 14 via wire 121. The emitter of transistor 111 is connected to ground and the collector of transistor 111 is connected to the inputs of NOR gates 102 and 103. The strobe input to gates 102 and 103 is the output of one shot 119 and is transmitted on line 122. The collector of transistor 111 is also connected to one of the ends of resistor 124 and the other end of resistor 124 is connected to the positive terminal of battery 14 via wire 123. The output of gate 102 is coupled to the input of inverter 129 and the output of inverter 129 is coupled to the base of NPN transistor 105 and the base of NPN transistor 106. The output of gate 103 is connected to the base of NPN transistor 104 and the base of NPN transistor 107. The emitter of transistor 104 is tied to the collector of transistor 105 and the emitter of transistor 104 and the collector of transistor 105 are connected to one of the ends of coil 13. The collector of transistor 104 is connected to the collector of transistor 106 and the collectors of the aforementioned transistors are connected to the positive terminal of battery 14 via wire 115. The emitter of transistor 105 is connected to the emitter of transistor 107 and the emitter of the above transistors are connected to ground. One of the ends of coil 13 is connected to the collector of transistor 107 and the emitter of transistor 106.

One of the ends of resistor 127 is coupled to the positive terminal of battery 14 via wire 126, and the other end of resistor 127 is connected to one of the ends of capacitor 128. Resistor 127 is also connected to the input of one shot 119, and to switch 15. Switch 15 is connected to the negative terminal of battery 14. The other end of capacitor 128 is coupled to ground. One shot 119 is coupled to the positive terminal of battery 14 via wire 125 and one shot 119 is also connected to ground.

The pressing of shutter switch 15 will cause a negative ground potential to be placed on the input of one shot 119, which will cause one shot 119 to have a pulsed output which will strobe the inputs of NOR gates 102 and 103. NOR gates 102 and 103 are configured as inverters and will be referred to as inverters hereinafter. When inverters 102 and 103 are enabled by the pulse from one shot 119, their outputs will control transistors 104, 105, 106 and 107 in either a forward fashion or no fashion at all depending on the polarity of the pulse.

The outputs of inverters 102 and 103 are determined by photocell 110. If little or low light is present when someone takes a picture with a camera (not shown) the set trip point of photocell 110 would be at a high potential. This would cause the base of transistor 111 to be at a high potential. Thus, transistor 111 would be off, and a high potential would be on the inputs of inverters 102 and 103. With a high input on inverter 102 and 103 there would be a low output from inverters 102 and 103. The output of inverter 102 is inverted by inverter 129. Thus, inverter 129 has a high output which causes transistors 105 and 106 to be in an off state. The low output from inverter 103 goes to the bases of transistor 104 and 107 causing them to turn on. At this juncture current is transmitted from battery 14 via wire 115 through transistor 104 and through coil 13 through transistor 107 to ground. The foregoing described the low light condition illustrated in FIG. 5. In this instance pole piece 20 of FIG. 5 will act as a North pole. Hence, actuator 17 will pivot to the position shown in FIG. 5 (position 2) and shutter blades 25 and 27 will be in their maximum open position causing the maximum aperture opening.

When photocell 110 senses a high light condition, photocell 110 causes the base of transistor 111 (whether switch 15 is depressed or not) to turn on. This causes the inputs to inverters 102 and 103 to be low, and the outputs of inverters 102 and 103 to be high. The output from inverter 103 causes transistors 104 and 107 to be high. Thus transistors 104 and 107 are in an off state. The output of inverter 102 is high which causes the output of inverter 129 to be low. This causes transistors 105 and 106 to be turned on which allows current to be transmitted from battery 14 via wire 115 to go through transistor 106 through coil 13 through transistor 105 to ground. Thus, the current travelled in an opposite direction that was previously described. The foregoing is only allowed to happen during the output pulse of one shot 119 that turns on the strobe input of inverters 102 and 103. This only happens when switch 15 is depressed, i.e. when someone wants to take a picture.

In the case where current is transmitted through transistor 106 the light condition illustrated in FIG. 6 would be present. Pole piece 21 of FIG. 6 would act as a North pole. Hence, actuator 17 would pivot to the position shown in FIG. 6 (position 3) and shutter blades 25 and 27 will be in their minimum open position. Aperture orifices 26 and 28 will form a small aperture opening to allow a small amount of light to enter the camera (not shown).

If switch 15 was not depressed, i.e. if someone did not want to take a picture with the camera (not shown), one shot 119 would not have an output pulse which would strobe the inputs of inverters 102 and 103. Thus, no current would be supplied to coil 13 and the condition illustrated in FIG. 4 would be present. Hence, actuator 17 would pivot to the position shown in FIG. 4 (position 1) so that shutter blades 25 and 27 will completely cover aperture 31.

The above specification describes a new and improved device and method for electromagnetically activating the shutter of a camera. It is realized that the above description may indicate to those skilled in the art additional ways in which the principles of this invention may be used without departing from the spirit. It is, therefore, intended that this invention be limited only by the scope of the appended claims.

What is claimed is:

1. A electromagnetic camera shuttering device that utilizes an armature for producing a first magnetic field, and one or more stops the movement of a shutter, said device comprises:
    a shutter blade adapted to move across an aperture of the camera which is held against a stop and then released to control the amount of light that is allowed to enter said aperture; and
    a movable magnet that produces a second magnetic field, said second magnetic field is coupled to said first magnetic field and a portion of said magnet is sized and shaped to fit said magnet to an orifice in said blade, so that when a portion of said magnet if placed in said orifice said blade will be directly connected to said magnet to produce a low rotational inertia, and the presence or absence of said first magnetic field will cause said magnet and said blade to move together to open or close said aperture;
    whereby said blade and said magnet will have an increased speed due to the low rotational inertia.

2. The device claimed in claim 1 wherein a portion of said magnet and said shutter orifice are shaped to counter balance the mass of said blade to reduce said blades oscillations due to rough handling of the camera, thereby preventing unwanted exposures of the film contained in said camera.

3. The device claimed in claim 2 wherein the counterbalancing of said magnet and said blade and the connection of said blade to said shutter are performed by having a portion of said magnet lug shaped and a portion of said shutter shaped to engage the lug shaped portion of said magnet.

4. The device claimed in claim 2 wherein said magnet has an orifice in its bottom surface so that a pin located between the pole pieces of said armature may be inserted in said bottom orifice to permit said magnet to rotate about said pin.

5. The device claimed in claim 4 wherein said magnet has an orifice in its top surface so that a pin may be inserted in said top orifice to counterbalance the mass of said blade.

6. The device claimed in claim 2 wherein said magnet has an orifice running from its bottom surface to its top surface so that a pin may be inserted in the orifice to act as a bearing for said magnet.

7. The device claimed in claim 1 wherein said magnet is a permanent magnet.

8. The device claimed in claim 6 wherein said pin has a lug shaped surface that nests with said magnets lug shaped portion so that said magnet and said pin will rotate together.

9. A device for damping the oscillations of a shutter blade of an electromagnetic camera shuttering system that controls the movement of a shutter blade, that moves between stops across the aperture of a camera to control the amount of light that is allowed to enter the camera, said device comprises:
    an armature containing one or more air gaps for producing a first magnetic field; and
    a movable magnet that produces a second magnetic field, said magnet is placed in the vicinity of said armature to form one or more air gaps which couples said second magnetic field to said first magnetic field so that the presence or absence of said first magnetic field will cause said magnet to move the shutter blade to different positions, and said armature is located a distance from the center of magnetic flux density of said magnet to bias said magnet against one or more members in the camera to produce friction that dampens the oscillations caused by the shutter blade or said magnet striking the stops.

10. A device for damping the oscillations of a shutter blade of an electromagnetic camera shuttering system that controls the movement of a shutter blade, that moves between one or more members across the aperture of the camera to control the amount of light that is allowed to enter the camera, said device comprises:
    an armature containing one or more air gaps for producing a first magnetic field; and
    a movable magnet that produces a second magnetic field, said magnet is placed in the vicinity of said armature to form one or more air gaps which couples said second magnetic field to said first magnetic field so that the presence or absence of said first magnetic field will cause said magnet to move said blade to different positions, and said armature is located a distance from the center of magnetic flux density of said magnet to bias said magnet against one or more members int he camera to produce friction that dampens the oscillations caused by said blade or said magnet settling to one or more equilibrium positions.

* * * * *